US012756622B2

(12) United States Patent
Mohapatra et al.

(10) Patent No.: US 12,756,622 B2
(45) Date of Patent: Oct. 6, 2026

(54) DYNAMIC LINK SPEED SWITCHING

(71) Applicant: QUALCOMM Incorporated, San Diego, CA (US)

(72) Inventors: Lalita Mohapatra, Hyderabad (IN); Lakshit Tyagi, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 36 days.

(21) Appl. No.: 18/936,657

(22) Filed: Nov. 4, 2024

(65) Prior Publication Data

US 2026/0128949 A1 May 7, 2026

(51) Int. Cl.
*H04L 41/083* (2022.01)
*H04L 43/0894* (2022.01)

(52) U.S. Cl.
CPC ........ *H04L 41/083* (2013.01); *H04L 43/0894* (2013.01)

(58) Field of Classification Search
CPC ............... H04L 41/083; H04L 43/0876; H04L 43/0882; H04L 43/0888; H04L 43/0894
See application file for complete search history.

(56) References Cited

U.S. PATENT DOCUMENTS

| | | | | |
|---|---|---|---|---|
| 8,806,244 | B1 | 8/2014 | Abts et al. | |
| 2017/0093631 | A1* | 3/2017 | Volpe | H04L 41/083 |
| 2017/0280385 | A1* | 9/2017 | Klacar | G06F 1/3296 |
| 2018/0343613 | A1 | 11/2018 | Levy et al. | |
| 2020/0089522 | A1 | 3/2020 | Qiu | |
| 2020/0371579 | A1* | 11/2020 | Selvam | G06F 1/3278 |
| 2024/0356827 | A1* | 10/2024 | Jones | H04L 43/022 |
| 2025/0298762 | A1* | 9/2025 | Turmes | G06F 13/20 |

FOREIGN PATENT DOCUMENTS

| | | | | |
|---|---|---|---|---|
| WO | WO-2013063485 A1 * | 5/2013 | | H04L 49/10 |
| WO | WO-2020050128 A1 * | 3/2020 | | H04L 43/0876 |

OTHER PUBLICATIONS

International Search Report and Written Opinion PCT/US2025/051347 ISA/EPO Dec. 12, 2025.

* cited by examiner

*Primary Examiner* — Jonathan A Bui
(74) *Attorney, Agent, or Firm* — LOZA & LOZA. LLP

(57) ABSTRACT

Aspects relate to dynamic link speed switching of a link between a device and an additional device based on the current utilized bandwidth on the link. The device may be configured to calculate the current utilized bandwidth and compare the current utilized bandwidth to the current link speed of the link. The device may further be configured to modify or switch the current link speed to a new link speed that is nearest to and greater than the current utilized bandwidth by at least a threshold amount.

20 Claims, 6 Drawing Sheets

DYNAMIC LINK SPEED SWITCHING

TECHNICAL FIELD

The technology discussed below relates generally to link management, and more particularly, to dynamic modification of link speed based on link bandwidth utilization.

INTRODUCTION

As computing technology has evolved to support multiple devices distributed across a network, data transfer speeds have become increasingly important. One example of a computer network technology that enables high speed data transfer is the Ethernet networking technology. Ethernet is commonly used in local area networks (LANs), including home networks, metropolitan area networks (MANs), and wide area networks (WANs) to connect remotely positioned devices, such as computers, switches, or routers, through Ethernet cables (e.g., twisted pair or fiber optic). Each device includes an Ethernet network interface controller (NIC) card to enable the device to communicate with other devices via respective Ethernet links to the other devices. Ethernet NIC cards with link speeds higher than five gigabits per second (Gbps) are increasingly becoming available in routers and other devices.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a device is provided that includes a network interface coupled to a link between the device and an additional device and one or more processors coupled to the network interface and configured to calculate a current utilized bandwidth on the link, compare the current utilized bandwidth to a current link speed of the link, and modify the current link speed of the link to a new link speed nearest to and greater than the current utilized bandwidth by at least a threshold amount.

Another example provides a method for link speed management at a device. The method includes calculating a current utilized bandwidth on a link between the device and an additional device, comparing the current utilized bandwidth to a current link speed of the link, and modifying the current link speed of the link to a new link speed nearest to and greater than the current utilized bandwidth by at least a threshold amount.

Another example provides a device including means for calculating a current utilized bandwidth on a link between the device and an additional device, means for comparing the current utilized bandwidth to a current link speed of the link, and means for modifying the current link speed of the link to a new link speed nearest to and greater than the current utilized bandwidth by at least a threshold amount.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
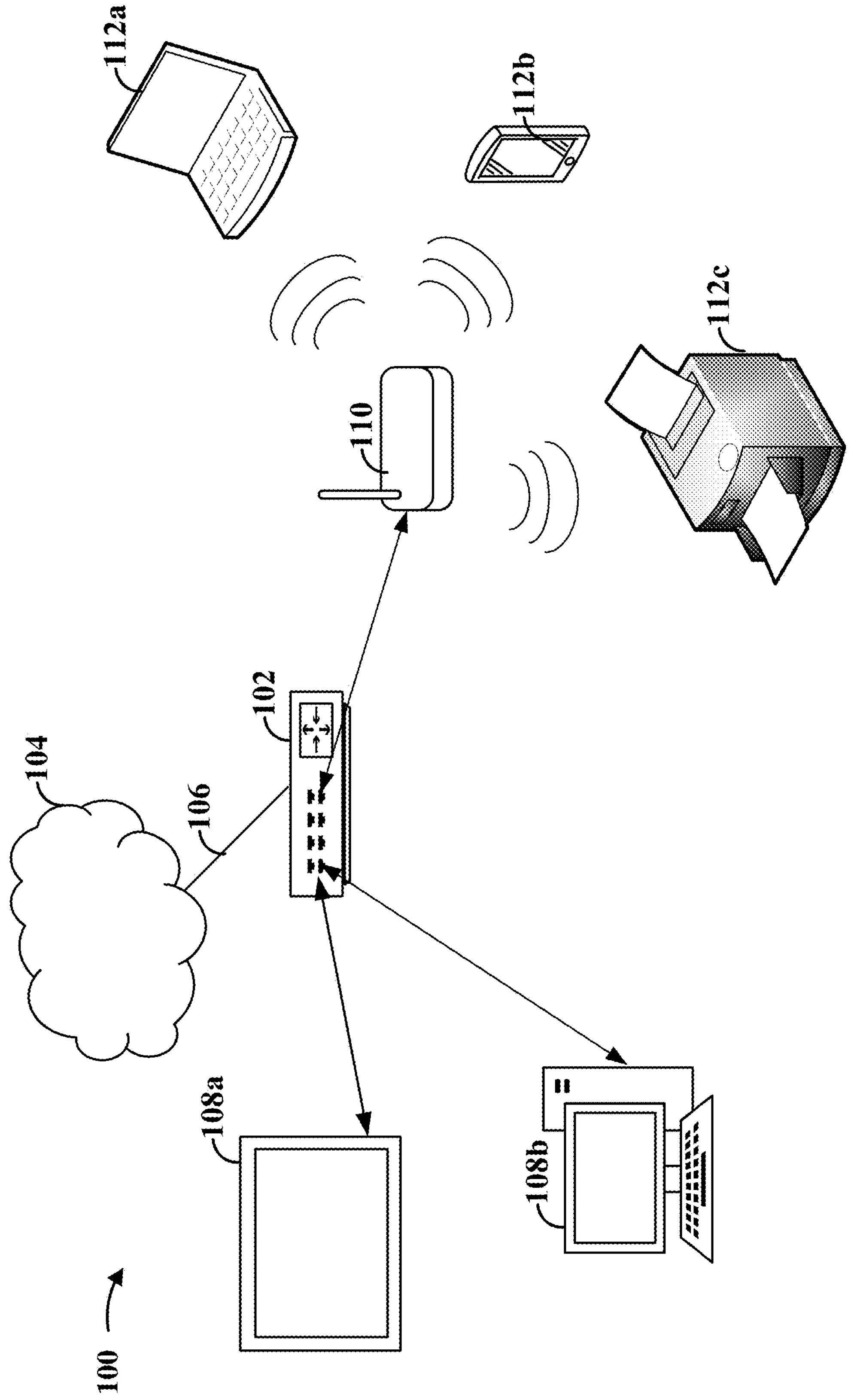
FIG. 1 is a diagram depicting a local area network employing a router providing Ethernet networking technology according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of described examples. It is intended that innovations described herein may be practiced in a wide variety of devices, chip-level components, systems, distributed arrangements, end-user devices, etc., of varying sizes, shapes, and constitution.

An apparatus, such as a router, computer, printer, or any other suitable device, may include an internal or external network interface configured to provide a wired or wireless connection to a network. For example, a device may include an Ethernet network interface controller (NIC) card configured to couple to an Ethernet link (e.g., a wired Ethernet cable) to provide a connection between the device and one or more other connected devices in a wired local area network (LAN) or wide area network (WAN). Presently, Ethernet NIC cards with speeds greater than 5 gigabits per second (Gbps) are increasingly becoming available in routers and other similar products. However, the data traffic on these devices may be less than the maximum supported link speed. For example, the data traffic may be less than 1 Gbps, resulting in less than thirty percent of the available bandwidth being utilized. However, with higher link speeds, the power consumption increases regardless of the actual amount of utilized link bandwidth. This power burn is observed in both Ethernet components on system-on-chip (SoC) infrastructure components.

In various aspects of the disclosure, to optimize the power consumption on devices and thereby improve the overall energy rating of the device, a link speed moderator may be included on the device to modify the current link speed based on the current utilized bandwidth on the link. For example, the link speed moderator may be configured as an application program interface (API) in an Ethernet driver that is configured to interact with the Ethernet hardware on the Ethernet peripheral device (e.g., Ethernet NIC card). The link speed moderator may periodically perform an analysis of the current active data flow on the Ethernet peripheral device to calculate a current utilized bandwidth on the link. The link speed moderator may then compare the calculated current utilized bandwidth with a current link speed of the link and modify the link speed based on the comparison. For example, the link speed moderator may change the current link speed to a new link speed that is greater than and nearest to the current utilized bandwidth. For example, the new link speed may be greater than the current utilized bandwidth by at least a threshold amount. In some examples, the threshold amount may vary based on the new link speed.

In some examples, the new link speed is less than the current link speed. In this example, dynamically adjusting the link speed based on the actual bandwidth usage may significantly reduce the power usage, and as a result, reduce device heating. In other examples, the new link speed is greater than the current link speed. For example, after link reduction, if the utilized bandwidth increases to within a threshold amount of the current link speed, the link speed may be increased to prevent underutilization of the link speed capabilities.

In some examples, the link speed moderator may monitor a plurality of buffers at the device to identify a number of utilized buffers and calculate the current utilized bandwidth based on the number of utilized buffers. For example, the link speed moderator may multiply a buffer size of the buffers with the number of utilized buffers to calculate the current utilized bandwidth. In an example, to determine the number of utilized buffers, the link speed moderator may read a tail pointer value of a descriptor ring of a plurality of descriptors, each pointing to a respective buffer and update a packet count indicative of the number of utilized buffers based on the tail pointer value. The link speed moderator may then multiply a buffer size of the buffers with the packet count to calculate the current utilized bandwidth.

FIG. 1 is a diagram depicting a local area network employing a router providing Ethernet networking technology according to some aspects. The local area network 100 shown in FIG. 1 may be, for example, a home area network including a router 102 configured to connect to a network 104 (e.g., the Internet) via an Ethernet link (e.g., a twisted pair or fiber optic Ethernet cable). The home area network 100 may further include various wired devices (e.g., smart television 108*a* and personal computer 108*b*) and wireless devices (e.g., laptop computer 112*a*, mobile phone 112*b*, and printer 112*c*) coupled to the router 102 via respective wired and wireless links to enable file sharing, streaming services, online gaming, and other digital activities. For example, wired devices 108*a* and 108*b* may be coupled to the router 102 via respective Ethernet links or other wired links. In addition, wireless devices 112*a*, 112*b*, and 112*c* may be coupled to the router 102 via a wireless router 110 (e.g., a Wi-Fi router). In some examples, the wireless router 110 may be coupled to the router 102 via a wired link, such as an Ethernet link. In other examples, the wireless router 110 functionality may be incorporated in the router 102. In some examples, one or more of the wired devices 108*a* and/or 108*b* may further or alternatively be configured to couple to the router 102 via the wireless router 110.

Figure 2:
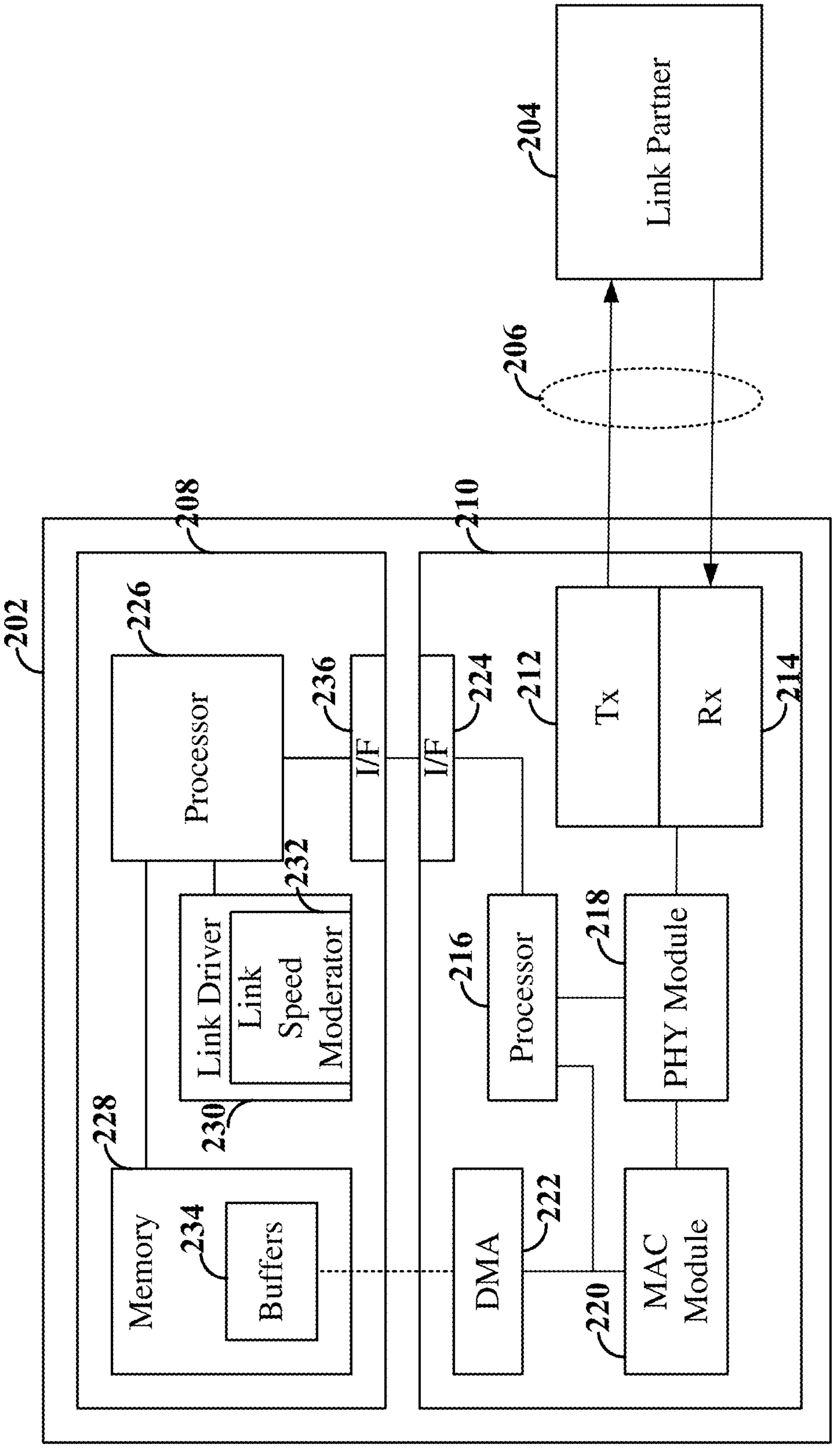
FIG. 2 is a diagram depicting a device configured for dynamic link speed switching according to some aspects.

FIG. 2 is a diagram depicting a device configured for dynamic link speed switching according to some aspects. The device 202 can be, for example, a router or other suitable device employing a host (e.g., system-on-chip (SoC)) 208 and a network interface 210 (e.g., a wired or wireless network interface). In the example shown in FIG. 2, the network interface is an Ethernet NIC card configured to connect to a link partner 204 (e.g., another device) via a link 206 (e.g., an Ethernet link).

The network interface 210 includes transmitter circuitry 212 and receiver circuitry 214 coupled to the Ethernet link 206. The transmitter circuitry 212 and receiver circuitry 214 may support a single lane (×1) or a higher number of lanes, depending on the configuration of the device 202 and the link partner 204. The network interface 210 further includes one or more processors (e.g., one exemplary processor 216 shown in FIG. 2) that can be configured to perform various functions of the network interface 210, along with a physical layer (PHY) module 218, and a medium access control (MAC) module 220 configured to process data packets (e.g., Ethernet frames including encapsulated Internet Protocol (IP) packets) sent and received on the Ethernet link 206.

The host 208 includes one or more processors (e.g., one exemplary processor 226 shown in FIG. 2) that can be configured to perform various functions of the host 208, including, for example, functions typically performed by a router or other suitable device. In some aspects, the processor 226 and processor 216 may each include a microprocessor, a microcontroller, an embedded controller, a logic circuit, software, firmware, ASIC, or any kind of processing device, for performing one or more of the functions described herein as being performed by the device 202.

The host 208 can further include one or more memories (e.g., one exemplary memory 228 shown in FIG. 2). The memory 228 shown in FIG. 2 may be, for example, a volatile memory, such as a double-data rate (DDR) memory (e.g., DDR synchronous dynamic random access (SDRAM)) that serves as the main memory of the device 202. The host 208 may be coupled to the network interface 210 via respective communication interfaces (I/F) 224 and 236 on the host 208 and network interface 210. For example, the communication interfaces 224 and 236 may be a peripheral component interconnect express (PCIe) interfaces. The network interface 210 may further include a direct memory access (DMA) interface 222 configured to access the main memory 228 on the host 208. For example, the memory 228 may include a plurality of buffers 234 and the DMA 222 may be configured to select and access one or more of the buffers 234 to store data packets received via the link 206.

The processor 226 may further be configured to execute a link driver 230 (e.g., Ethernet (ETH) driver) configured to communicate with the network interface hardware to initiate and manage the link 206. For example, the link driver 230 may be configured to set an initial link speed of the link based on the link speeds supported by the device 202 (network interface 210) and the link partner 204. For example, supported link speeds may include, but are not limited to, 10 Mbps, 100 Mbps, 1 Gbps, 2.5 Gbps, 5 Gbps, and 10 Gbps. It should be understood that different and/or higher link speeds may also be supported.

For some devices, such as routers, the data traffic on the link may be significantly less than that allowed by the link speed. For example, the link speed may be 5 Gbps or higher, but the utilized link bandwidth may be less than 1 Gbps. Even though the link bandwidth is lower than the available bandwidth on the link, higher power is still consumed by the device due to the Ethernet NIC card (network interface 210) being configured to operate on the higher link speed. This power burn is observed on both the network interface 210 and the SoC 208. In general, higher link speeds result in higher power burn on the device, as shown in Table 1 below.

TABLE 1

| Level 2 | 10 Mbps (mA) | 100 Mbps (mA) | 1 Gbps (mA) | 2.5 Gbps (mA) | 5 Gbps (mA) | 10 Gbps (mA) |
|---|---|---|---|---|---|---|
| DDRPHY | 0.16 | 0.16 | 0.16 | 1.08 | 1.08 | 1.08 |
| DIGITAL_CX_MDM | 5.56 | 5.61 | 5.93 | 15.61 | 16.03 | 16.80 |
| DIGITAL_MXA_MDM | 3.52 | 3.50 | 3.55 | 3.55 | 3.56 | 3.63 |
| DIGITAL_MXC_MDM | 0.14 | 0.14 | 0.15 | 0.13 | 0.14 | 0.14 |
| PMIC | 3.91 | 3.92 | 3.93 | 4.47 | 4.49 | 4.54 |
| ETHERNET | 177.96 | 232.62 | 336.14 | 339.91 | 440.88 | 577.27 |
| Total | 214.16 | 268.71 | 372.54 | 387.75 | 489.04 | 626.28 |

In various aspects, to optimize the power consumption on the device 202, thereby improving the overall energy rating of the device, a link speed moderator 232 may be included on the device 202 to modify the current link speed based on the current utilized bandwidth on the link 206. For example, the link speed moderator 232 may be configured as an application program interface (API) on the link driver 230 (e.g., Ethernet driver) that is configured to interact with the Ethernet hardware on the Ethernet NIC card 210. The link speed moderator 232 may periodically perform an analysis of the current active data flow on the Ethernet NIC card 210 to calculate a current utilized bandwidth on the link 206. The link speed moderator 232 may then compare the calculated current utilized bandwidth with a current link speed of the link 206 (e.g., as set by the link driver 230) and modify the link speed based on the comparison. For example, the link speed moderator 232 may change the current link speed to a new link speed that is greater than and near to the current utilized bandwidth to prevent overutilization or underutilization of the Ethernet link speed capabilities.

In some examples, the new link speed is less than the current link speed and the new link speed is closer to the current utilized bandwidth to prevent overutilization of link speed capabilities. For example, if the link 206 is brought up with 10 Gbps link speed, but the link speed moderator 232 determines that the current utilized bandwidth is only 800 Mbps, the link speed moderator 232 can change the link speed of the link 206 to an available link speed (e.g., 1 Gbps) supported by the network interface 210 that is closer to, but still greater than, the current utilized bandwidth. This link speed reduction would result in saving approximately 10 mA of SoC power and approximately 240 mA of Ethernet power, as indicated in Table 1 above.

In other examples, the new link speed is greater than the current link speed. In some examples, the link speed moderator 232 may modify the current link speed to a new link speed that is greater than the current link speed based on a difference between the current utilized bandwidth and the current link speed. For example, the link speed moderator 232 may modify the current link speed to the new, greater link speed in response to the difference between the current utilized bandwidth and the current link speed being greater than or equal to a threshold amount. In some examples, the threshold amount may vary depending on the current link speed. For example, a first threshold of 2 Mbps may be applicable to a current link speed of 10 Mbps, a second threshold of 20 Mbps may be applicable to a current link speed of 100 Mbps, a third threshold of 100 Mbps may be applicable to a current link speed of 1 Gbps, and so on. In an example, if the device's Ethernet link 206 is currently at a link speed of 1 Gbps and the link speed moderator 232 calculates the actual utilized link bandwidth is more than 900 Mbps, the link speed moderator 232 may increase the link speed to a higher link speed supported by the Ethernet NIC card (e.g., 2.5 Gbps) to prevent underutilization of Ethernet link speed capabilities.

To prevent flip-flopping between link speeds, the threshold amounts may further be applied to the link speed reduction example. For example, the current link speed may be reduced to the new link speed in response to the new link speed being greater than the current utilized bandwidth by a threshold amount. This threshold amount may be specific to the new link speed or associated with at least the new link speed, as discussed above. Thus, in both the example of reducing the link speed and increasing the link speed, the new link speed may be both nearest to and greater than the current utilized bandwidth by at least a threshold amount.

In some examples, the link speed moderator 232 may calculate the current utilized bandwidth based on the current number of utilized buffers 234 in the memory 228. For example, the link speed moderator 232 may monitor the buffers 234 to identify a number of utilized buffers and calculate the current utilized bandwidth based on the number of utilized buffers. For example, the link speed moderator 232 may multiply a buffer size of each of the buffers 234 with the number of utilized buffers to calculate the current utilized bandwidth.

Figure 3:
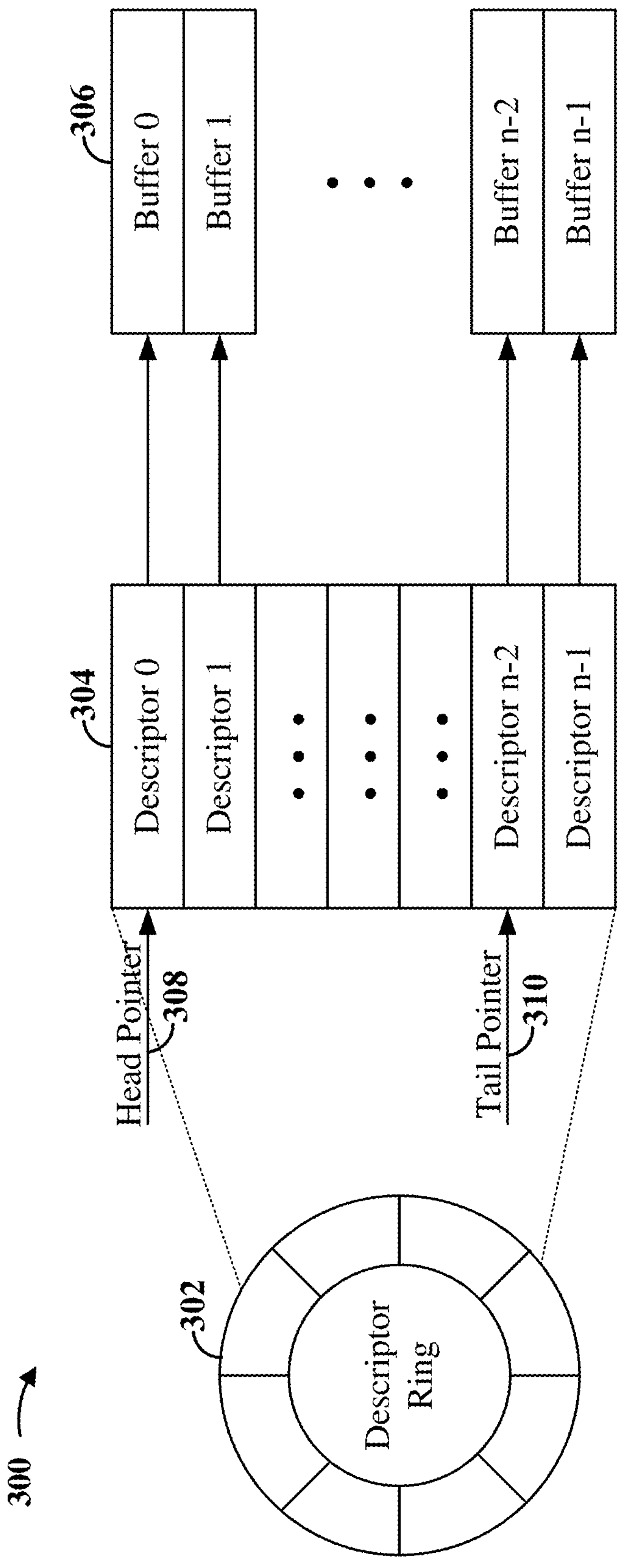
FIG. 3 is a diagram illustrating a configuration of Ethernet buffers indicative of a link bandwidth according to some aspects.

FIG. 3 is a diagram illustrating a configuration of Ethernet buffers indicative of a link bandwidth according to some aspects. As shown in FIG. 3, a memory 300 (e.g., a DDR or other main memory) of a device (e.g., a host of the device) may include a descriptor ring 302 including a plurality of descriptors 304 (e.g., Descriptor 0 . . . Descriptor n−1). Each descriptor 304 may identify or point to one of a plurality of buffers 306 (Buffer 0 . . . . Buffer n−1) included in the host memory 300. For example, there may be a separate descriptor 304 for each buffer 306 in the memory 300. The descriptors 304 may be, for example, DMA descriptors that may be selected by the DMA of the Ethernet NIC card.

The descriptor ring 302 includes a head pointer 308 and a tail pointer 310 that may be accessible by the DMA of the Ethernet NIC card and an Ethernet driver (e.g., link speed moderator) at the host. The head pointer 308 points to a first descriptor 304 (e.g., Descriptor 0) associated with a first utilized buffer (Buffer 0) in the memory 300, whereas the tail pointer 310 points to a last descriptor 304 (e.g., Descriptor n−2) associated with a last utilized buffer (Buffer n−2) in the memory 300. Each buffer 306 is configured to store a certain amount of data. For example, each buffer 306 may be configured to store 2 kilobytes (KB) of data, which corresponds to 2 KB of data packets communicated over the link. By reading the tail pointer 310, the link speed moderator can determine the number of descriptors 304, and therefore the number of buffers 306, that have been utilized so far to temporarily store data communicated on the link.

As each buffer is configured to store in essence a 2 KB data packet, the tail pointer value is indicative of a packet count and the packet count is further indicative of the number of utilized buffers. For example, the link speed moderator may be configured to read the tail pointer value periodically (e.g., every 1 μsecond) and update the current packet count based on the current tail pointer value. The link speed moderator may then be configured to calculate the current utilized bandwidth periodically (e.g., every 1 second) based on the current packet count. For example, the link speed moderator can calculate the current utilized bandwidth by multiplying the latest (current) packet count with the buffer size (e.g., 2 KB).

In some examples, if the calculated current utilized bandwidth is less than the current link speed, the link speed moderator may be configured to change the link speed based on the Ethernet (ETH) PHY capabilities. In some examples, the link speed moderator may further be configured to change the link speed based on one or more threshold amounts associated with the link speeds, as discussed above. For example, if the calculated utilized bandwidth is 720 Mbps, the current programmed link speed is at 10 Gbps, and the ETH PHY supports 100 Mbps, 1 Gbps, 5 Gbps, and 10 Gbps speeds, the link speed moderator may change the Ethernet link speed to 1 Gbps (as this is the nearest roof link speed value supported by the ETH PHY and that is greater than a threshold amount (e.g., 100 Mbps) from the calculated utilized bandwidth). This may result in a savings of approximately 11 mA based on Table 1 above.

Figure 4:
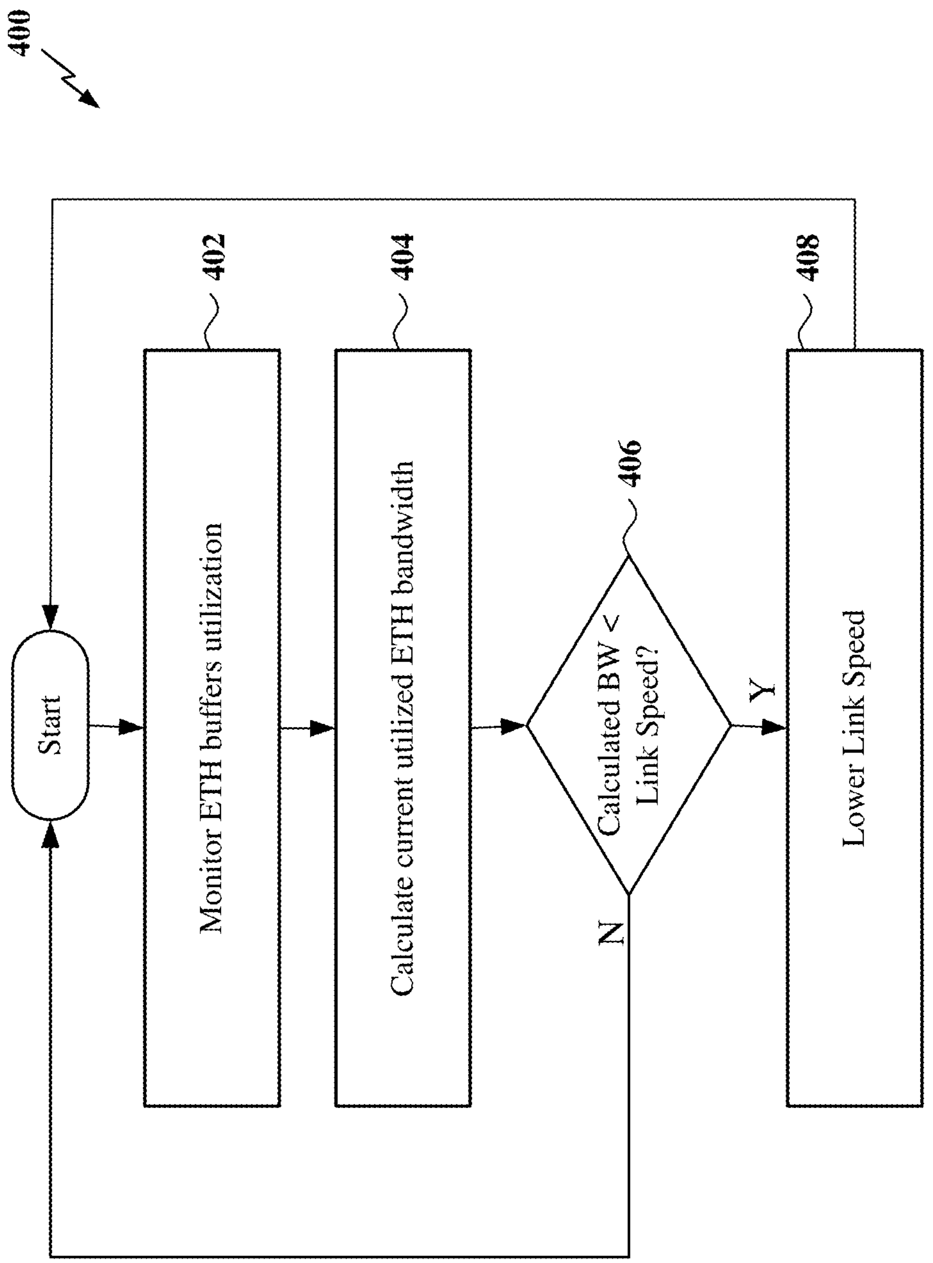
FIG. 4 is a flow chart illustrating an exemplary process for dynamic link speed reduction according to some aspects.

FIG. 4 is a flow chart illustrating an exemplary process for dynamic link speed reduction according to some aspects. As described below, some or all illustrated features may be omitted in a particular implementation within the scope of the present disclosure, and some illustrated features may not be required for implementation of all embodiments. In some examples, the process 400 may be carried out by the host 208 (e.g., including at least the processor 226 and the link speed moderator 232) illustrated in FIG. 2 and/or by the device 202 shown in FIG. 2. In some examples, the process 400 may be carried out by any suitable apparatus or means for carrying out the functions or algorithm described below.

At block 402, the process begins with monitoring Ethernet (ETH) buffers utilization. In some examples, the link speed moderator may monitor a plurality of buffers in the main memory of the device to identify a number of utilized buffers. In some examples, the link speed moderator may read a tail pointer value of a descriptor ring of a plurality of descriptors, each pointing to a respective buffer of the plurality of buffers, and update a packet count indicative of the number of utilized buffers based on the tail pointer value.

At block 404, the process continues with calculating a current utilized Ethernet (ETH) bandwidth. In some examples, the link speed moderator may calculate the current utilized ETH bandwidth based on the number of utilized buffers. For example, the link speed moderator may multiply a buffer size of each of the plurality of buffers with the number of utilized buffers (or packet count) to calculate the current utilized bandwidth. In some examples, the current utilized ETH bandwidth may be calculated per second.

At block 406, the process continues with determining whether the calculated bandwidth (current utilized bandwidth) is less than a current link speed of the link. If the calculated bandwidth is not less than the current link speed, the process returns to block 402 to monitor the ETH buffers utilization.

If the calculated bandwidth is less than the current link speed (Y branch of block 406), at block 408, the process continues with lowering (reducing) the link speed of the link. For example, the current link speed may be reduced to a new link speed that is nearest to and greater than the current utilized bandwidth. In some examples, the new link speed is greater than the current utilized bandwidth by at least a threshold amount to prevent underutilization of the link. In some examples, the threshold amount varies based on the new link speed (e.g., the threshold amount is specific to or otherwise associated with at least the new link speed). In some examples, the new link speed is selected from a plurality of available link speeds supported by the link (e.g., by the device ETH NIC card and the link partner device ETH NIC card).

Figure 5:
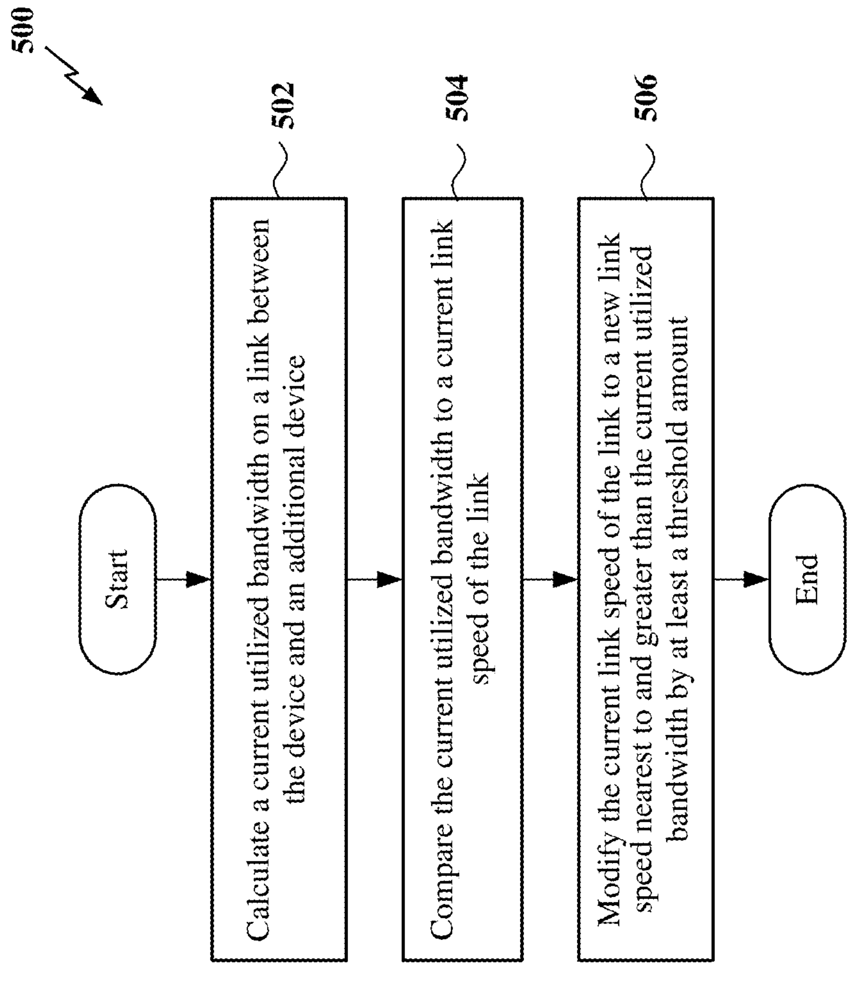
FIG. 5 is a flow chart illustrating an exemplary process for dynamic link speed switching according to some aspects.

FIG. 5 is a flow chart illustrating an exemplary process for dynamic link speed switching according to some aspects. As described below, some or all illustrated features may be omitted in a particular implementation within the scope of the present disclosure, and some illustrated features may not be required for implementation of all embodiments. In some examples, the process 500 may be carried out by the host 208 (e.g., including at least the processor 226 and link speed moderator 232) illustrated in FIG. 2 and/or by the device 202 shown in FIG. 2. In some examples, the process 500 may be carried out by any suitable apparatus or means for carrying out the functions or algorithm described below.

At block 502, the process begins with calculating a current utilized bandwidth on a link between the device and an additional device. In some examples, the link speed moderator may monitor a plurality of buffers at the device to identify a number of utilized buffers and calculate the current utilized bandwidth based on the number of utilized buffers. In some examples, the link speed moderator may multiply a buffer size of each of the plurality of buffers with the number of utilized buffers to calculate the current utilized bandwidth. In some examples, the link speed moderator may read a tail pointer value of a descriptor ring of a plurality of descriptors, each pointing to a respective buffer of the plurality of buffers, update a packet count indicative of the number of utilized buffers based on the tail pointer value, and multiply a buffer size of each of the plurality of buffers with the packet count to calculate the current utilized bandwidth.

At block 504, the process continues with comparing the current utilized bandwidth to a current link speed of the link. At block 506, the process continues with modifying the current link speed of the link to a new link speed nearest to and greater than the current utilized bandwidth by at least a threshold amount. In some examples, the new link speed is selected from a plurality of available link speeds supported by the link. In some examples, the new link speed is less than the current link speed. In some examples, the new link speed is greater than the current link speed. In some examples, the threshold amount varies based on the new link speed.

Figure 6:
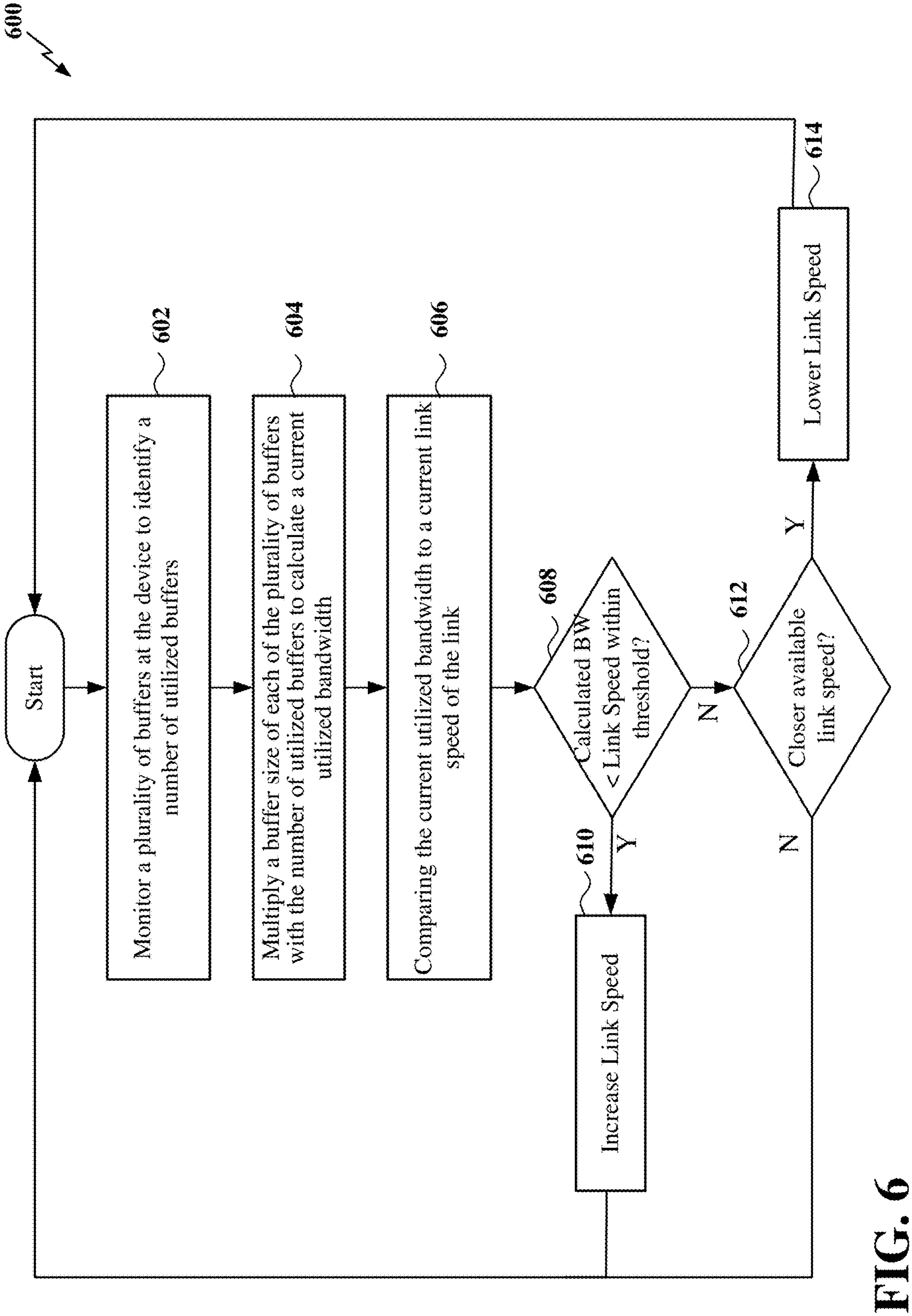
FIG. 6 is a flow chart illustrating another exemplary process for dynamic link speed switching according to some aspects.

FIG. 6 is a flow chart illustrating another exemplary process for dynamic link speed switching according to some aspects. As described below, some or all illustrated features may be omitted in a particular implementation within the scope of the present disclosure, and some illustrated features may not be required for implementation of all embodiments. In some examples, the process 600 may be carried out by the host 208 (e.g., including at least the processor 226 and link speed moderator 232) illustrated in FIG. 2 and/or by the device 202 shown in FIG. 2. In some examples, the process 600 may be carried out by any suitable apparatus or means for carrying out the functions or algorithm described below.

At block 602, the process begins with monitoring a plurality of buffers at the device to identify a number of utilized buffers. In some examples, the link speed moderator may read a tail pointer value of a descriptor ring of a plurality of descriptors, each pointing to a respective buffer of the plurality of buffers, update a packet count indicative of the number of utilized buffers based on the tail pointer value.

At block 604, the process continues with multiplying a buffer size of each of the plurality of buffers with the number of utilized buffers to calculate a current utilized bandwidth of the link. In some examples, the link speed moderator may multiply the buffer size with the packet count to calculate the current utilized bandwidth.

At block 606, the process continues with comparing the current utilized bandwidth to a current link speed of the link. At block 608, the process continues with determining whether the calculated bandwidth (current utilized bandwidth) is less than the current link speed within a threshold amount. For example, the link speed moderator may determine whether the current utilized bandwidth is both less than the current link speed and within a threshold amount from the current link speed. If so, the process continues at block 610 with increasing the link speed of the link to a new link speed. For example, the new link speed can be the link speed that is both nearest to the current utilized bandwidth and greater than the current utilized bandwidth by at least the threshold amount.

If the calculated bandwidth is less than the current link speed by more than the threshold amount, the process continues at block 612 with determining whether there is a closer available link speed that is closer to the current utilization bandwidth than the current link speed. If so, the process continues at block 614 with lowering the link speed of the link to a new link speed. For example, the new link speed can be the link speed that is both nearest to the current utilization bandwidth and greater than the current utilization bandwidth by a threshold amount associated with the new link speed.

In one configuration, a device includes means for calculating a current utilized bandwidth on a link between the device and an additional device, means for comparing the current utilized bandwidth to a current link speed of the link, and means for modifying the current link speed of the link to a new link speed nearest to and greater than the current utilized bandwidth by at least a threshold amount. In one aspect, the aforementioned means may be the processor 226 executing the link speed moderator 232 shown in FIG. 2 to perform the functions recited by the aforementioned means. In another aspect, the aforementioned means may be a circuit or any apparatus configured to perform the functions recited by the aforementioned means.

Of course, in the above examples, the processor 226 is merely provided as an example, and other means for carrying out the described functions may be included within various aspects of the present disclosure, including any other suitable apparatus or means described in any one of the FIGS. 1, 2, and/or 3, and utilizing, for example, the processes and/or algorithms described herein in relation to FIGS. 4-6.

The following provides an overview of aspects of the present disclosure:

Aspect 1: A method for link speed management at a device, the method comprising: calculating a current utilized bandwidth on a link between the device and an additional device; comparing the current utilized bandwidth to a current link speed of the link; and modifying the current link speed of the link to a new link speed nearest to and greater than the current utilized bandwidth by at least a threshold amount.

Aspect 2: The method of aspect 1, wherein the calculating the current utilized bandwidth further comprises: monitoring a plurality of buffers at the device to identify a number of utilized buffers; and calculating the current utilized bandwidth based on the number of utilized buffers.

Aspect 3: The method of aspect 2, wherein the calculating the current utilized bandwidth further comprises: multiplying a buffer size of each of the plurality of buffers with the number of utilized buffers to calculate the current utilized bandwidth.

Aspect 4: The method of aspect 2 or 3, further comprising: reading a tail pointer value of a descriptor ring of a plurality of descriptors, wherein each of the plurality of descriptors points to a respective buffer of the plurality of buffers; updating a packet count based on the tail pointer value, wherein the packet count is indicative of the number of utilized buffers; and multiplying a buffer size of each of the plurality of buffers with the packet count to calculate the current utilized bandwidth.

Aspect 5: The method of any of aspects 1 through 4, wherein the new link speed is selected from a plurality of available link speeds supported by the link.

Aspect 6: The method of any of aspects 1 through 5, wherein the new link speed is less than the current link speed.

Aspect 7: The method of any of aspects 1 through 5, wherein the new link speed is greater than the current link speed.

Aspect 8: The method of any of aspects 1 through 7, wherein the threshold amount varies based on the new link speed.

Aspect 9: The method of any of aspects 1 through 8, wherein the link is an Ethernet link and the device comprises an Ethernet network interface controller (NIC) card.

Aspect 10: A device comprising a network interface coupled to a link between the device and an additional device and one or more processors coupled to the network interface and configured to perform a method of any of aspects 1 through 9.

Aspect 11: A device comprising means for performing a method of any of aspects 1 through 9.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-6 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 3 may be configured to perform one or more of the methods, features, or steps described herein. The novel algorithms described herein may also be efficiently implemented in software and/or embedded in hardware.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for link speed management at a device, the method comprising:
- calculating a current utilized bandwidth on a link between the device and an additional device, wherein the calculating the current utilized bandwidth comprises:
  - monitoring a plurality of buffers at the device to identify a number of utilized buffers; and
  - calculating the current utilized bandwidth based on the number of utilized buffers;
- comparing the current utilized bandwidth to a current link speed of the link; and
- modifying the current link speed of the link to a new link speed nearest to and greater than the current utilized bandwidth by at least a threshold amount.

2. The method of claim 1, wherein the calculating the current utilized bandwidth further comprises:
- multiplying a buffer size of each of the plurality of buffers with the number of utilized buffers to calculate the current utilized bandwidth.

3. The method of claim 1, further comprising:
- reading a tail pointer value of a descriptor ring of a plurality of descriptors, wherein each of the plurality of descriptors points to a respective buffer of the plurality of buffers;
- updating a packet count based on the tail pointer value, wherein the packet count is indicative of the number of utilized buffers; and
- multiplying a buffer size of each of the plurality of buffers with the packet count to calculate the current utilized bandwidth.

4. The method of claim 1, wherein the new link speed is selected from a plurality of available link speeds supported by the link.

5. The method of claim 1, wherein the new link speed is less than the current link speed.

6. The method of claim 1, wherein the new link speed is greater than the current link speed.

7. The method of claim 1, wherein the threshold amount varies based on the new link speed.

8. The method of claim 1, wherein the link is an Ethernet link and the device comprises an Ethernet network interface controller (NIC) card.

9. A device, comprising:
- a network interface coupled to a link between the device and an additional device;
- one or more memories comprising a plurality of buffers; and
- one or more processors coupled to the network interface and configured to:
  - monitor the plurality of buffers at the device to identify a number of utilized buffers;
  - calculate a current utilized bandwidth on the link based on the number of utilized buffers;
  - compare the current utilized bandwidth to a current link speed of the link; and
  - modify the current link speed of the link to a new link speed nearest to and greater than the current utilized bandwidth by at least a threshold amount.

10. The device of claim 9, wherein the one or more processors are further configured to:
- multiply a buffer size of each of the plurality of buffers with the number of utilized buffers to calculate the current utilized bandwidth.

11. The device of claim 9, wherein the one or more processors are further configured to:
- read a tail pointer value of a descriptor ring of a plurality of descriptors, wherein each of the plurality of descriptors points to a respective buffer of the plurality of buffers;
- update a packet count based on the tail pointer value, wherein the packet count is indicative of the number of utilized buffers; and
- multiply a buffer size of each of the plurality of buffers with the packet count to calculate the current utilized bandwidth.

12. The device of claim 9, wherein the new link speed is selected from a plurality of available link speeds supported by the link.

13. The device of claim 9, wherein the new link speed is less than the current link speed.

14. The device of claim 9, wherein the new link speed is greater than the current link speed.

15. The device of claim 9, wherein the threshold amount varies based on the new link speed.

16. The device of claim 9, wherein the link is an Ethernet link and the device comprises an Ethernet network interface controller (NIC) card.

17. A device, comprising:
- means for monitoring a plurality of buffers at the device to identify a number of utilized buffers;
- means for calculating a current utilized bandwidth on a link between the device and an additional device based on the number of utilized buffers;
- means for comparing the current utilized bandwidth to a current link speed of the link; and
- means for modifying the current link speed of the link to a new link speed nearest to and greater than the current utilized bandwidth by at least a threshold amount.

18. The device of claim 17, wherein the new link speed is selected from a plurality of available link speeds supported by the link.

19. The device of claim 17, wherein the new link speed is less than the current link speed.

20. The device of claim 17, wherein the new link speed is greater than the current link speed.

* * * * *